United States Patent
Takizawa

(10) Patent No.: US 7,543,105 B2
(45) Date of Patent: Jun. 2, 2009

(54) MEMORY ACCESS CONTROL BASED ON HIT PREDICTION

(75) Inventor: Tetsuro Takizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 466 days.

(21) Appl. No.: 10/811,290

(22) Filed: Mar. 26, 2004

(65) Prior Publication Data

US 2004/0193787 A1    Sep. 30, 2004

(30) Foreign Application Priority Data

Mar. 26, 2003    (JP)    ............................. 2003-084790

(51) Int. Cl.
*G06F 12/06*    (2006.01)
(52) U.S. Cl. ...................... 711/105; 711/154
(58) Field of Classification Search .................. None
See application file for complete search history.

(56) References Cited

U.S. PATENT DOCUMENTS

| | | | | |
|---|---|---|---|---|
| 5,485,589 A | * | 1/1996 | Kocis et al. | 711/213 |
| 5,604,883 A | * | 2/1997 | King et al. | 711/154 |
| 5,664,153 A | * | 9/1997 | Farrell | 711/154 |
| 5,848,025 A | * | 12/1998 | Marietta et al. | 365/238.5 |
| 5,889,714 A | * | 3/1999 | Schumann et al. | 365/203 |
| 6,052,756 A | * | 4/2000 | Barnaby et al. | 711/105 |
| 6,266,752 B1 | * | 7/2001 | Witt et al. | 711/200 |
| 6,785,793 B2 | * | 8/2004 | Aboulenein et al. | 711/167 |
| 6,799,241 B2 | * | 9/2004 | Kahn et al. | 711/105 |
| 6,976,122 B1 | * | 12/2005 | Sander et al. | 711/105 |
| 7,020,762 B2 | * | 3/2006 | Sprangle et al. | 711/204 |
| 7,133,995 B1 | * | 11/2006 | Isaac et al. | 711/204 |
| 2003/0061459 A1 | * | 3/2003 | Aboulenein et al. | 711/167 |

FOREIGN PATENT DOCUMENTS

| | | |
|---|---|---|
| JP | 02-232890 | 9/1990 |
| JP | 04-007762 | 1/1992 |
| JP | 05-334175 | 12/1993 |
| JP | 11-282746 | 10/1999 |
| JP | 2001-166985 | 6/2001 |

* cited by examiner

*Primary Examiner*—Reginald G Bragdon
*Assistant Examiner*—Eric Loonan
(74) *Attorney, Agent, or Firm*—Scully, Scott, Murphy & Presser PC

(57) ABSTRACT

A memory access control system is provided which includes a memory master to make a request for access to memory, a memory control section to produce control signals of memories based on access information and a high predicting section to predict whether the next access to each bank in memory is obtained to a same page (hit is found) wherein the memory control section, when the hit predicting section predicts that a hit is found, terminates its routine without closing the bank being presently accessed at time of completion of present access operations and, when the hit predicting section predicts that a miss is found, closes a bank being presently accessed and terminates its routine.

6 Claims, 10 Drawing Sheets

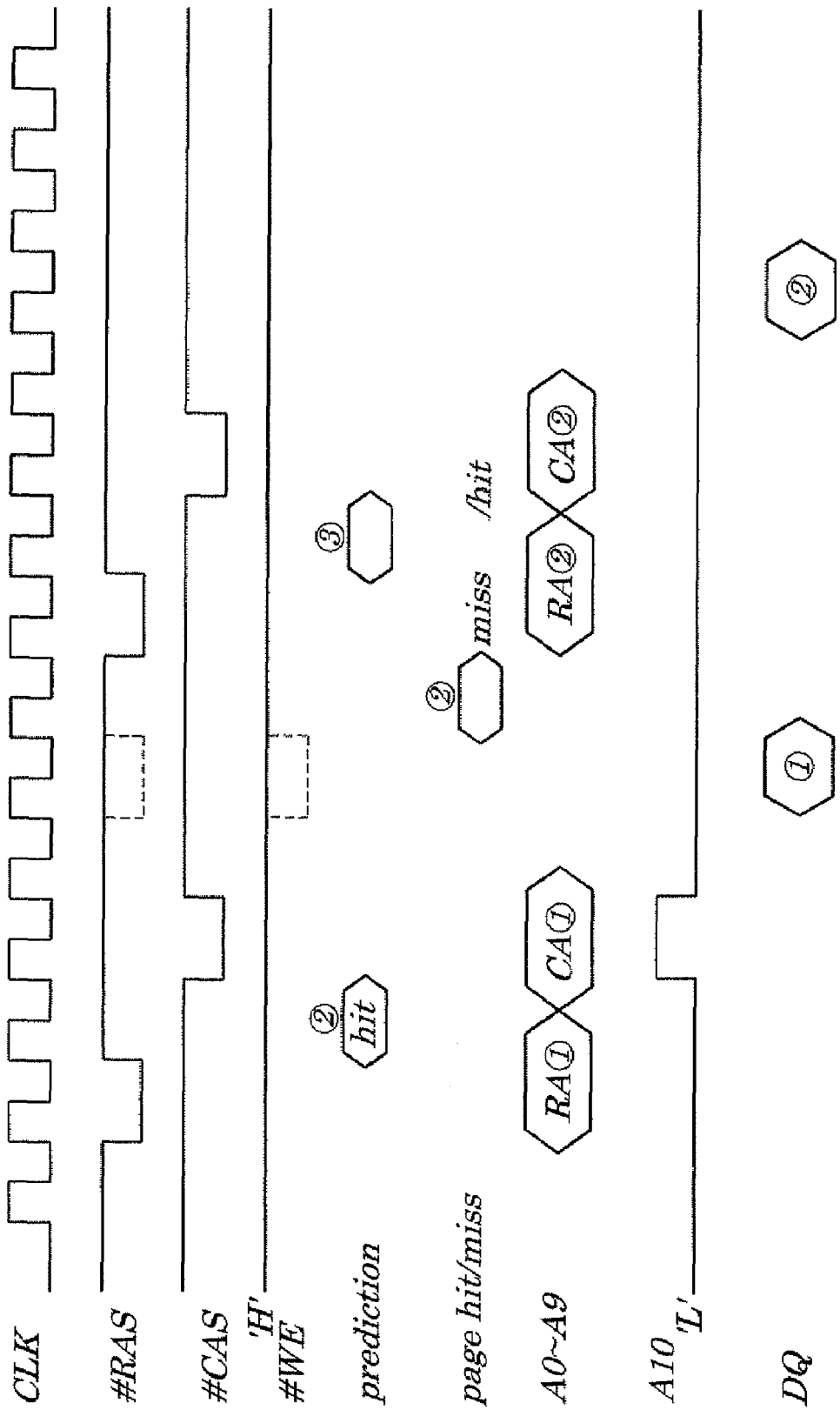

MEMORY ACCESS CONTROL BASED ON HIT PREDICTION

BACKGROUND OF THE INVENTION

1. Field of the Invention

The present invention relates to a memory access control device to be employed in a DRAM (Dynamic Random Access Memory) such as an SDRAM (Synchronous DRAM), DDR (Double Data Rate) -SDRAM and more particularly to the memory access control device capable of enhancing access performance by predicting whether or not a hit is found.

The present application claims priority of Japanese Patent Application No. 2003-084790 filed on Mar. 26, 2003, which is hereby incorporated by reference.

2. Description of the Related Art

A conventional memory access control method is either an open page policy in which, when access to a DRAM is completed, a routine is terminated without pre-charging an accessed bank, or a closed page policy in which a routine is terminated after the accessed bank has been pre-charged.

If a bank is in a state where the bank has been already pre-charged and closed, the same bank, when being accessed next time, can be accessed at a constant speed regardless of its address. However, where a bank has not been pre-charged but has been opened, if a same page as its bank has previously opened is to be accessed, since opening of the page is not required, the bank can be accessed speedily when compared with the bank that has been closed. However, when accessing a page that is different from a page whose bank has been opened, the bank will be accessed at a slower speed when compared to the closed bank because the accessed page must be opened after the bank has been pre-charged.

Finding data on a given page is called a "hit" and failure to find data on a given page is called a "miss".

A memory control device employing a conventional open page policy is disclosed in which access efficiency is improved by changing the timing with which a bank is closed according to the number of hits to a bank (Japanese Patent Application Publication No. 2001-166985).

Both the closed page policy and open page policy have problems. The closed page policy heightens access performance when the probability of a hit is low, while the open page policy heightens access performance when a probability of the hit is high. However, neither policy will enable a system to reach its theoretical limit for access performance.

Further, in a memory control device employing an open page policy, wherein the time at which a bank is closed is changed according to the number of hits to the bank, if misses are found continuously in a short interval, the access efficiency of the device will not improve because the bank is always kept open after each access attempt.

Moreover, the conventional memory control device has another problem. That is, when the shortest time with which a bank is closed is set to be shorter than an interval for access to a memory, since the operation becomes the same as that of the closed page policy, if many hits are found, there is no improvement of access efficiency.

SUMMARY OF THE INVENTION

In view of the above, it is an object of the present invention to provide a memory access control device capable of enhancing memory access efficiency by predicting whether or not a hit is found in a subsequent access.

According to a first aspect of the present invention, there is provided a memory access control device including:

a memory master to make a request for access to memory;

a memory control unit to produce control signals of memories based on access information to be output from the memory master; and a hit predicting unit to predict whether or not next access to each bank in memory is access to a same page;

wherein the memory control unit, when a hit predicting unit predicts that a next access to the bank will be directed to a same page, that is, that a hit is found, terminates its routine without closing a bank being presently accessed at the time of completion of present access operations and, when the hit predicting unit predicts that next access to the bank is access to a different page, that is, that a miss is found, closes the bank being presently accessed at the time of completion of present access operations and terminates its routine.

In the foregoing, a preferable mode is one wherein the hit predicting unit stores results from recent (last) "n" ("n" is a natural number) accesses to each bank in memory as to whether a hit has been found or a miss has been found and predicts, if a number of times of accesses by which a hit is found out of recent "n" accesses is "m" or more (m≦n: "m" and "n" each is a natural number), that a hit is found in the next access to the bank and predicts, if the number of times of accesses is not "m" or more, that a miss is found in the next access to the bank.

Also, a preferable mode is one wherein the hit predicting unit stores results from recent "j" ("j" is a natural number) accesses to each bank in memory as to whether a hit has been found or a miss has been found and predicts, when a hit has been found in all recent "j" accesses, that a hit is found in the next access to the bank and predicts, if no hit has been found in all recent "j" times accesses, that a miss is found in the next access to the bank.

Also, a preferable mode is one wherein the hit predicting unit stores results from recent "k" ("k" is a natural number) accesses to each bank in memory as to whether a hit has been found or a miss has been found and predicts, if a miss has been found in all recent "k" accesses, that a miss is found in the next access to the bank and predicts, if no miss has been found in all recent "k" times accesses, that a miss is found in the next access to the bank.

Also, a preferable mode is one wherein the hit predicting unit stores results from recent "k" ("k" is a natural number) accesses to each bank in memory as to whether a hit has been found or a miss has been found and predicts, when a miss has been found in all recent "k" accesses out of recent n times accesses, that a miss is found in the next access to the bank and predicts, when no miss has been found in all recent "k" accesses out of recent "n" accesses, if a hit is found in recent "j" accesses (j≦n: "j" and "n" each is a natural number) out of recent "n" accesses, that a hit is found in the next access to the bank and predicts, when a miss has been found in all recent "j" accesses out of recent "n" accesses, if a number of times of accesses by which a hit has been found out of recent "n" accesses is "m" times or more (m≦n: "m" and "n" each is a natural number), that a hit is found in the next access to the bank and predicts, when a number of times of accesses by which a hit has been found out of recent "n" accesses is not "m" times or more, that a miss is found in the next access to the bank.

Furthermore, a preferable mode is one wherein when a bank and a page to be accessed next have been determined, the memory master informs the memory control unit of information about the bank and the page to be accessed and wherein if the bank to be accessed next by the memory master is the same as that being presently accessed and the page to be accessed by the memory master is the same as that being presently accessed, the memory control unit terminates its routine, regardless of a prediction result from the hit predicting unit, without closing the bank being presently accessed at the time of completion of present access operations. When the memory control unit does not terminate its routine, if the bank to be accessed next by the memory master is the same as that being presently accessed and the page to be accessed by the memory master is different from that being presently accessed, the memory control unit closes the bank being presently accessed at the time of completion of present access operations, regardless of a prediction result from the hit predicting unit, and terminates its routine.

According to a second aspect of the present invention, there is provided a memory access control device including:

two or more memory masters to make a request for access to memory:

an arbiter unit to arbitrate memory access requests fed from the memory masters and to select access information fed from any one of the memory masters;

a memory control unit to produce a control signal of memory based on access information output from the arbiter unit; and a hit predicting unit to predict whether or not the next access to each bank in memory becomes access to a same page;

wherein the memory control unit, when the hit predicting unit predicts that the next access to the bank is access to a same page, that is, a hit is found, terminates its routine without closing the bank being presently accessed at the time of completion of present access operations, and when the hit predicting unit predicts that the next access to the bank is access to a different page, that is, that a miss is found, closes the bank being presently accessed at the time of present access operations and terminates its routine.

In the foregoing, a preferable mode is one wherein the hit predicting unit stores results from recent "n" ("n" is a natural number) accesses to each bank in memory as to whether a hit has been found or a miss has been found and predicts, if a number of accesses by which a hit is found out of recent "n" accesses is "m" or more (m≦n: "m" and "n" each is a natural number), that a hit is found in the next access to the bank and predicts, if the number of times of accesses is not "m" or more, that a miss is found in the next access to the bank.

Also, a preferable mode is one wherein the hit predicting unit stores results from recent "j" ("j" is a natural number) accesses to each bank in memory as to whether a hit has been found or a miss has been found and predicts, when a hit has been found in all recent "j" accesses, that a hit is found in the next access to the bank and predicts, if no hit has been found in all recent "j" accesses, that a miss is found in the next access to the bank.

Also, a preferable mode is one wherein the hit predicting unit stores results from recent "k" ("k" is a natural number) accesses to each bank in memory as to whether a hit has been found or a miss has been found and predicts, if a miss has been found in all recent "k" accesses, that a miss is found in the next access to the bank and predicts, if no miss has been found in all recent "k" accesses, that a hit is found in the next access to the bank.

Also, a preferable mode is one wherein the hit predicting unit stores results from recent "n" ("n" is a natural number) accesses to each bank in memory as to whether a hit has been found or a miss has been found and predicts, when a miss has been found in all recent "k" (k≦n: "k" and "n" each is a natural number) accesses out of recent "n" accesses, that a miss is found in the next access to the bank and predicts, when no miss has been found in all recent "k" accesses out of recent "n" times accesses, if a hit is found in all recent "j" accesses (j≦n: "j" and "n" each is a natural number) out of recent "n" accesses, that a hit is found in the next access to the bank and predicts, when a miss has been found in all recent "k" accesses out of recent "n" accesses, if a number of times of accesses by which a hit has been found out of recent "n" accesses is "m" times or more (m≦n: "m" and "n" each is a natural number), that a hit is found in the next access to the bank and predicts, when a number of times of accesses by which a hit has been found out of recent "n" accesses is not "m" times or more, that a miss is found in the next access to the bank.

Furthermore, a preferable mode is one wherein each memory master informs, when a bank and a page to be accessed next have been determined, the arbiter unit and the memory control unit of information about the bank and the page to be accessed and wherein the memory control unit, if there exists the memory master which gets the next access to a same bank as that being presently accessed and to a same page as that being presently accessed, closes the bank being presently accessed at the time of completion of present access operations, regardless of a prediction result fed from the hit predicting unit, and terminates its routine and, when not terminating its routine, if there exists the memory master which gets the next access to a same bank as that being presently accessed and to a page different from that being presently accessed, closes the bank being presently accessed at the time of completion of present access operations, regardless of a prediction result fed from a hit predicting unit, and terminates its routine and the arbiter unit, if there exists the memory master which gets the next access to a same bank and a same page as those being presently accessed, and selects said memory master with priority.

With the above configuration, when access is obtained to a same bank next time, if a hit is predicted, access is obtained according to an open page policy and if a miss is predicted, access is obtained according to a close page policy and therefore when the prediction comes true, performance reaching a theoretical limit can be achieved.

Moreover, even if the prediction does not come true completely, when a hit rate is 50% or more, since the number of times of decreases in misses becomes larger than the number of times of decreases in hits, a memory access rate is improved.

Furthermore, when access is obtained, whether an accessed bank is closed or opened is determined by predicting whether a hit is found in the next access and, therefore, even when access in which a miss is found occurs in short intervals continuously, access efficiency can be enhanced.

BRIEF DESCRIPTION OF THE DRAWINGS

The above and other objects, advantages, and features of the present invention will be more apparent from the following description taken in conjunction with the accompanying drawings in which:

FIG. 10 is a timechart showing a case in which the memory access control device of the present invention, while getting read-access, predicts a miss in the next access.

DETAILED DESCRIPTION OF THE PREFERRED EMBODIMENTS

Best modes of carrying out the present invention will be described in further detail using various embodiments with reference to the accompanying drawings.

Embodiment

Figure 1:
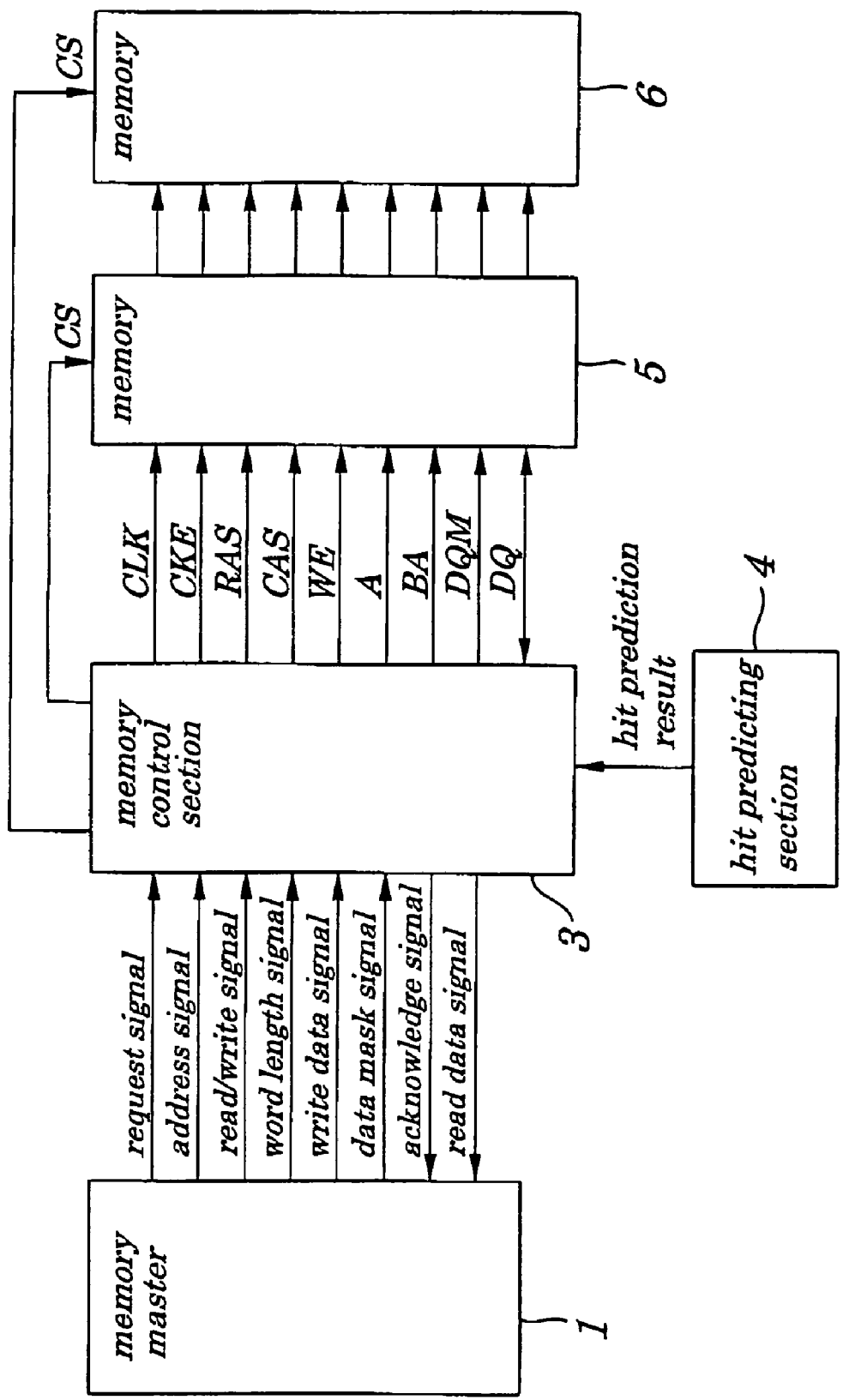
FIG. 1 is a block diagram showing a system made up of a memory access control device and plurality of memories corresponding to an embodiment of the present invention.

FIG. 1 is a block diagram showing a system made up of a memory control device 3 and a plurality of memories 5 and 6 corresponding to an embodiment of the present invention.

A memory master 1 outputs a request signal requesting a right to use memory, an address signal, a read/write signal showing types of accesses, a word length signal indicating the number of words to be accessed, a write data signal, and a data mask signal to the memory control section 3. The memory master 1 also receives an acknowledge signal and a read data signal indicating acquisition of a memory from the memory control section 3.

The memory control section 3 outputs control signals for memory. That is, in the case of an SDRAM, its memory control section 3 outputs a clock signal (CLK), a clock enable signal (CKE), a chip selection signal (CS), a row address strobe signal (RAS), a column address strobe signal (CAS), a write enable signal (WE), an address signal (A), a bank address signal (BA), a data input/output signal (DQ), and a data mask signal (DQM).

A hit predicting section 4 outputs a plurality of hit prediction results to the memory control section 3. The number of hit prediction results is the same as the total number of banks in all memories being connected. For example, if two memories 5 and 6, each being made up of four banks, are connected, since an entire system has eight banks, the prediction number obtained as the hit prediction results becomes eight.

The memory master 1, when access to memory is required, asserts or initiates a request signal and, at the same time, outputs an address signal, a read/write signal, a word length signal, a write data signal, and a data mask signal in a pre-defined format.

The memory control section 3, when the request signal fed from the memory master 1 is asserted, receives the address signal, the read/write signal, and the word length signal, and produces a control signal for memory if the read/write signal indicates "write access" to get access for writing and, if the read/write signal indicates "read access", to get access for reading.

The memory control section 3, if the read/write signal indicates "write access", receives a write data signal and a data mask signal and, if the read/writes signal indicates "read access", returns read data fed back from memories to the memory master 1 by using the read data signal.

The memory control section 3, when accessing last data, determines whether or not a bank being accessed presently is closed by making a reference to the hit prediction result fed from the hit predicting section 4.

The above last data is the last word, for example of the word length, such that, when the word length signal indicates that four words are to be accessed, the last data represents fourth word data.

Although the hit prediction results are fed from the hit predicting section 4, each result corresponds to any one of banks in the memories 5 and 6 in a one-to-one relationship, and the memory control section 3 makes a reference to a hit prediction result corresponding to the bank which stores last data.

Moreover, though the memory control section 3 determines whether or not to close a bank being presently accessed by making a reference to the bank storing the last data, if the next data is stored in a bank different from the bank being presently accessed, the memory control section 3 determines whether or not to close the bank being presently accessed by making a reference to the hit prediction result fed from the hit predicting section 4.

Figure 2:
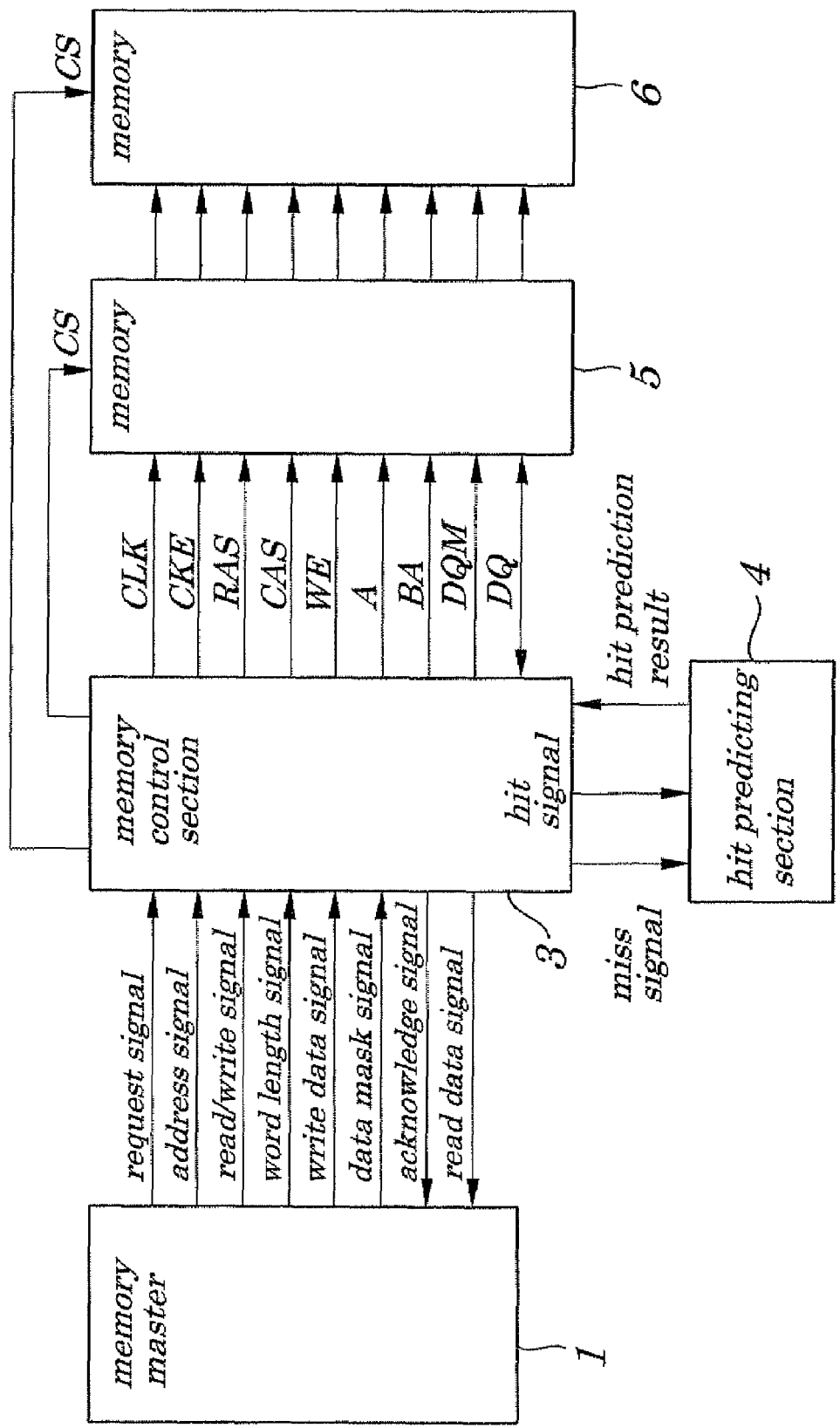
FIG. 2 is another block diagram showing the system made up of a memory control section and a plurality of memories corresponding to another embodiment of the present invention.

FIG. 2 is a also a block diagram showing a system made up of the memory control section 3 and a plurality of memories 5 and 6 corresponding to another embodiment of the present invention.

The hit predicting section 4 receives a hit signal or miss signal from the memory control section 3. Each of the number of hit results and miss results is the same as the total number of banks in each of the memories 5 and 6.

The memory control section 3, stores a page address of each bank that was accessed last. At a time of starting a next access, if the page address indicates the same page as that having been accessed the previous time, the memory control section 3 asserts a hit signal corresponding to a bank.

Moreover, at a time of starting an access, if the page address indicates a page different from the page having been accessed the previous time, the memory control section 3 asserts a miss signal corresponding to a bank.

The time when access is started includes not only a time when first access is started after a request signal fed from the memory master 1 has been asserted but also a time when the next access is started upon completion of storing of each of data being presently accessed and data to be accessed next in each of different banks before access to a length of words indicated by a word length signal.

Next, operations of the hit predicting section 4 corresponding to an embodiment shown in FIG. 2 of the present invention are described. The hit predicting section 4, every time a hit signal or a miss signal fed from the memory control section 3 is asserted, stores the result from asserting signals, corresponding to the number of recent (last) "n" ("n" denotes a natural number) times of assertion of the hit signals or the miss signals for each bank.

The hit predicting section 4 judges whether the number of times of asserting hit signals is "m" times or more (M≦n : "m" and "n" are natural numbers) for each bank and outputs, if the number of times of asserting hit signals is "m" times or more, information indicating that a hit is found as a hit prediction result and outputs, if the number of times of asserting the hit signal is less than "m" times, information indicating that a miss is found.

For example, if "n" is eight, the hit signals and the miss signals from a bank are asserted in order of hit, hit, miss, hit, hit, miss, hit, and miss, since the number of times of asserting hit signals is five in the most recent eight times asserting operations in this case. If "m" is give or less, a hit prediction result of the bank indicates that a hit is found and, if "m" is six or more, a hit prediction result of the bank indicates that a miss is found.

Moreover, after this, if a miss signal is asserted, the number of times of asserting hit signals is four in the most recent eight times asserting operations, and if instead of a miss signal a hit signal is asserted, the number of times of asserting hit signals is five and no change occurs. Moreover, "n" is determined at the time of system design and "m" is made variable depending on setting.

Next, operations of the hit predicting section 4 corresponding to another embodiment shown in FIG. 2 will be described. Every time a hit signal or a miss signal fed from the memory control section 3 is asserted, the hit predicting section 4 stores the result of the assertion, corresponding to the number of times of asserting the signals in recent "j" ("j" denotes a natural number) asserting times for each bank.

The hit predicting section 4 judges whether or not a result from asserting a hit signal or a miss signal for each bank indicates that a hit signal is asserted in all recent "j" asserting times operations and, if YES, outputs information indicating that a hit is found as a corresponding hit prediction result and, if NO, outputs information indicating that a miss is found.

For example, if "j" is found and if the hit signals and the miss signals of a bank are asserted in order of miss, hit, miss, miss, hit, hit, hit, and hit, since a hit signal is asserted in all of the most recent four times asserting operations, a hit prediction result of the bank indicates that a hit is found.

Moreover, after this, if a miss signal is asserted, the number of times of asserting a hit signal is three in the most recent four times asserting operations, so that a hit prediction result of the bank indicates that a miss is found. If instead of a miss signal a hit signal is asserted, a hit prediction result of the bank indicates a hit is found. Moreover, "j" is made variable depending on setting.

Next, operations of the hit predicting section 4 corresponding to yet another embodiment shown in FIG. 2 will be described. Every time a hit signal or a miss signal fed from the memory control section 3 is asserted, the hit predicting section 4 stores the result of the assertion, corresponding to the number of times of asserting the signals in recent "k" ("k" denotes a natural number) times asserting operations for each bank.

The hit predicting section 4 judges whether or not a result from asserting a hit signal or a miss signal for each bank indicates that a miss signal is asserted in all recent "k" times asserting operations and, if YES, outputs information indicating that a miss is found as a corresponding hit prediction result and, if NO, outputs information indicating that a hit is found.

For example, if "k" is four and if the hit signals and the miss signals from a bank are asserted in order of miss, hit, miss, hit, miss, miss, miss, and miss, since a miss signal is asserted in all of the most recent four times asserting operations, a hit prediction result of the bank indicates that a miss is found.

Moreover, after this, if a hit signal is asserted, the number of times of asserting a miss signal is three in the most recent four times asserting operations, a hit prediction result of the bank indicates that a hit is found. If instead of a hit signal a miss signal is asserted, a hit prediction result of the bank indicates that a miss is found. Moreover, "k" is made variable depending on setting.

Next, operations of the hit predicting section 4 corresponding to still another embodiment shown in FIG. 2 will be described. Every time a hit signal or a miss signal fed from the memory control section 3 is asserted, the hit predicting section 4 stores the result of the assertion, corresponding to the number of times of asserting the signals in recent "n" ("n" denotes a natural number) times asserting operations for each bank.

The hit predicting section 4 judges whether or not a result from asserting a hit signal or a miss signal for each bank indicates that a miss is found in all recent "k" times asserting operations and, if YES, outputs information indicating that a miss is found as a hit prediction result (k≦n: "k" and "n" each is a natural number).

On the other hand, the hit predicting section 4 judges whether or not a result from asserting a hit signal or a miss signal for each bank indicates that a hit is found in all recent "j" times asserting operations and, if YES, outputs information indicating that a hit is found as a hit prediction result (j≦n : "j" and "n" each is a natural number).

The hit predicting section 4 judges whether the number of times of asserting a hit signal for each bank is "m" times or more (m≦n : "m" and "n" each is a natural number) in recent "n" times asserting operations and, if the number of times of asserting a hit signal is "m" times or more, outputs information indicating that a hit is found as a hit prediction result and, if not, outputs, information indicating that a miss is found.

For example, if "n" is eight, "k" is four, "j" is four, and "m" is give, and if the hit signals and the miss signals from a bank are asserted in order of hit, hit, miss, hit, miss, miss, miss, and miss, since a miss is found in all of the most recent four times asserting operations, a hit prediction result of the bank indicates that a miss is found.

Moreover, if the hit signals and the miss signals from a bank are asserted in order of hit, hit, miss, miss, hit, hit, hit, and hit, since not a miss but a hit is found in all of the most recent four times asserting operations, a hit prediction result of the bank indicates that a hit is found.

Also, if the hit signals and the miss signals from a bank are asserted in order of hit, hit, miss, miss, hit, hit, hit and miss, though a miss is not found in all of the most recent four times asserting operations and a hit is not found in all of the most recent four times asserting operations, since a hit is found five times in the most recent eight times asserting operations, a hit prediction result of the bank indicates that a hit is found.

Furthermore, if the hit signals and the miss signals from a bank are asserted in order of miss, hit, miss, miss, hit, hit, hit and miss, though a miss is not found in all of the most recent four times asserting operations and a hit is not found in all of the most recent four times asserting operations, since a hit is found only four times in the most recent eight times asserting operations, a hit prediction result of the bank indicates that a miss is found.

Moreover, though "n" is determined at the time of designing a system, "m", "j" and "k" are made variable depending on setting.

Figure 3:
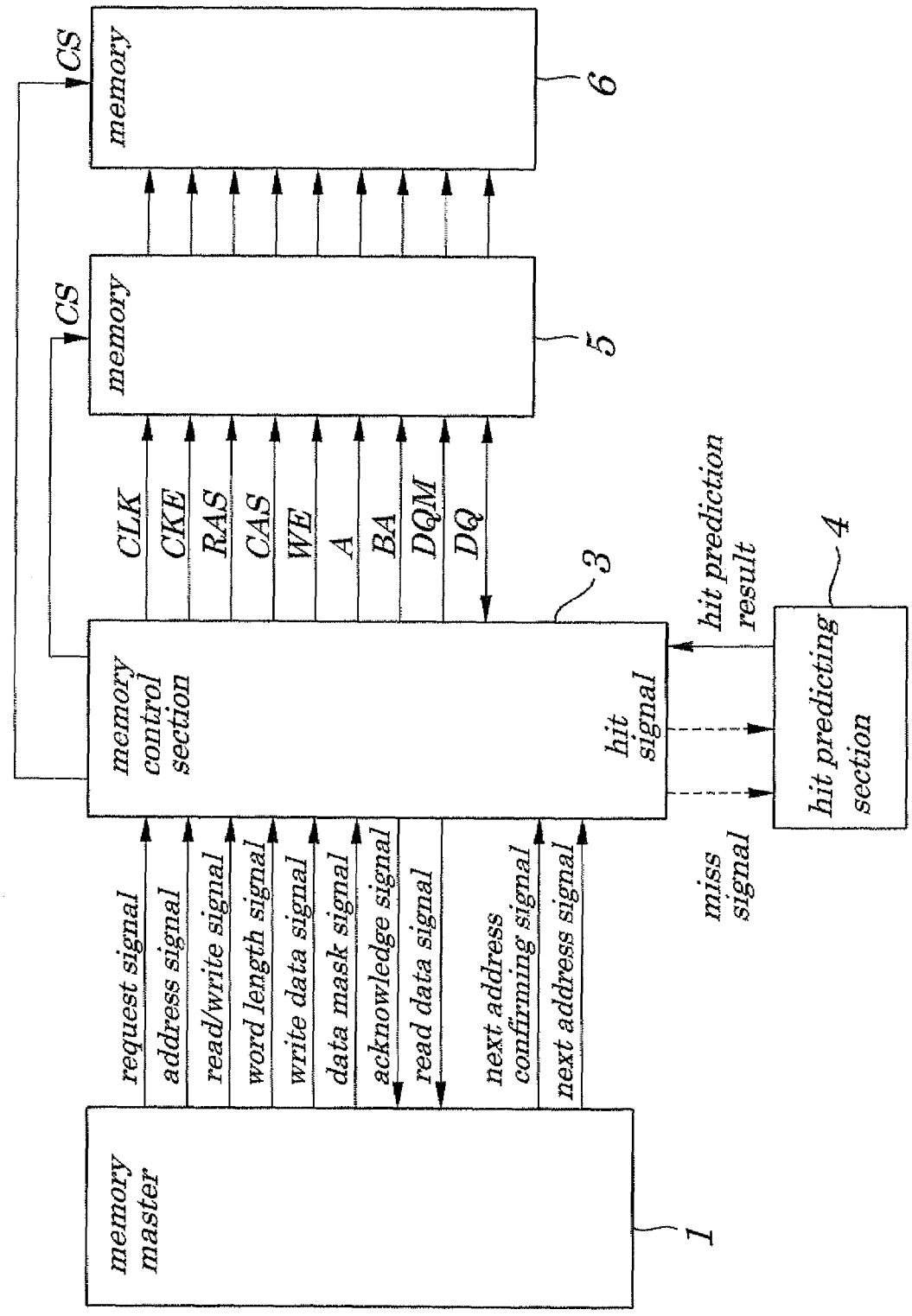
FIG. 3 is still another block diagram showing the system made up to the memory control section and a plurality of memories corresponding to still another embodiment of the present invention.

FIG. 3 is still another block diagram showing the system made up of the memory control section 3 and a plurality of memories 5 and 6 corresponding to another embodiment of the present invention.

In the system shown in FIG. 3, in addition to the embodiment corresponding to a first embodiment of the present invention, the memory master 1 outputs a next address signal indicating an address to be used when an access request is made and a next address confirming signal indicating to the memory control section 3 that the address signal is determined.

The memory control section 3, when getting access to the last data, determines whether or not a to close bank being presently accessed depending on a hit prediction result fed from the hit predicting section 4. At this point, if the memory master 1 outputs a next address confirming signal and when a bank and a page indicated by its next address signal are matched to the bank and the page being presently accessed, the memory control section 4 terminates its routine without closing the bank being presently accessed, regardless of a hit prediction result fed from the hit predicting section 4.

On the other hand, while the memory master 1 outputs an address confirming signal and if only the bank, of the bank and the page indicated by its address signal, is matched to the bank, of the bank and the page being presently accessed, and if the page, of the bank and the page indicated by its address signal, is not matched to the page, of the bank and the page being presently accessed, the memory control section 3 closes the bank being presently accessed and terminates its routine, regardless of a hit prediction result fed from the hit predicting section 4.

For example, assume that the memory master 1 is now getting access to a bank and a page and its last address is a bank 0 and a page 0. If the memory master 1 has asserted a next address confirming signal and if both a bank and a page indicated by a next address signal fed from the memory master 1 are 0, the memory control section 3 terminates its routine without closing the bank 0 at the time when the memory master 1 completes its access, regardless of a hit prediction result fed from the hit predicting section 4.

Though the memory master 1 accesses the bank 0 and page 0 next, since the bank 0 has been opened at page 0, the memory master 1 can start the next access immediately after the previous access is completed.

If the bank 0 had been closed at the time when the memory master 1 completes its access, access to memory would have to be started after having made the bank 0 active and time is spent before the next access to memory is started.

Also, if the bank and the page indicated by a next address signal fed from the memory master 1 are 0 and 1 respectively, the memory control section 3 closes the bank 0 and terminates its routine at the time when the memory master 1 completes access, regardless of a hit prediction result fed from the hit predicting section 4.

Though the memory master 1 next gets access to the bank 0 in memory, since the bank 0 had been closed, after previous access by the memory master 1 had been completed, the bank 0 is immediately made active and, after the bank 0 has been made active memory can be accessed.

If the bank 0 has not been closed when the previous access by the memory master 1 is completed, the bank 0 has to be made active after the bank 0 has been pre-charged following the completion of the previous access by the memory master 1 and therefore time is spend before the next access to memory is started.

Figure 4:
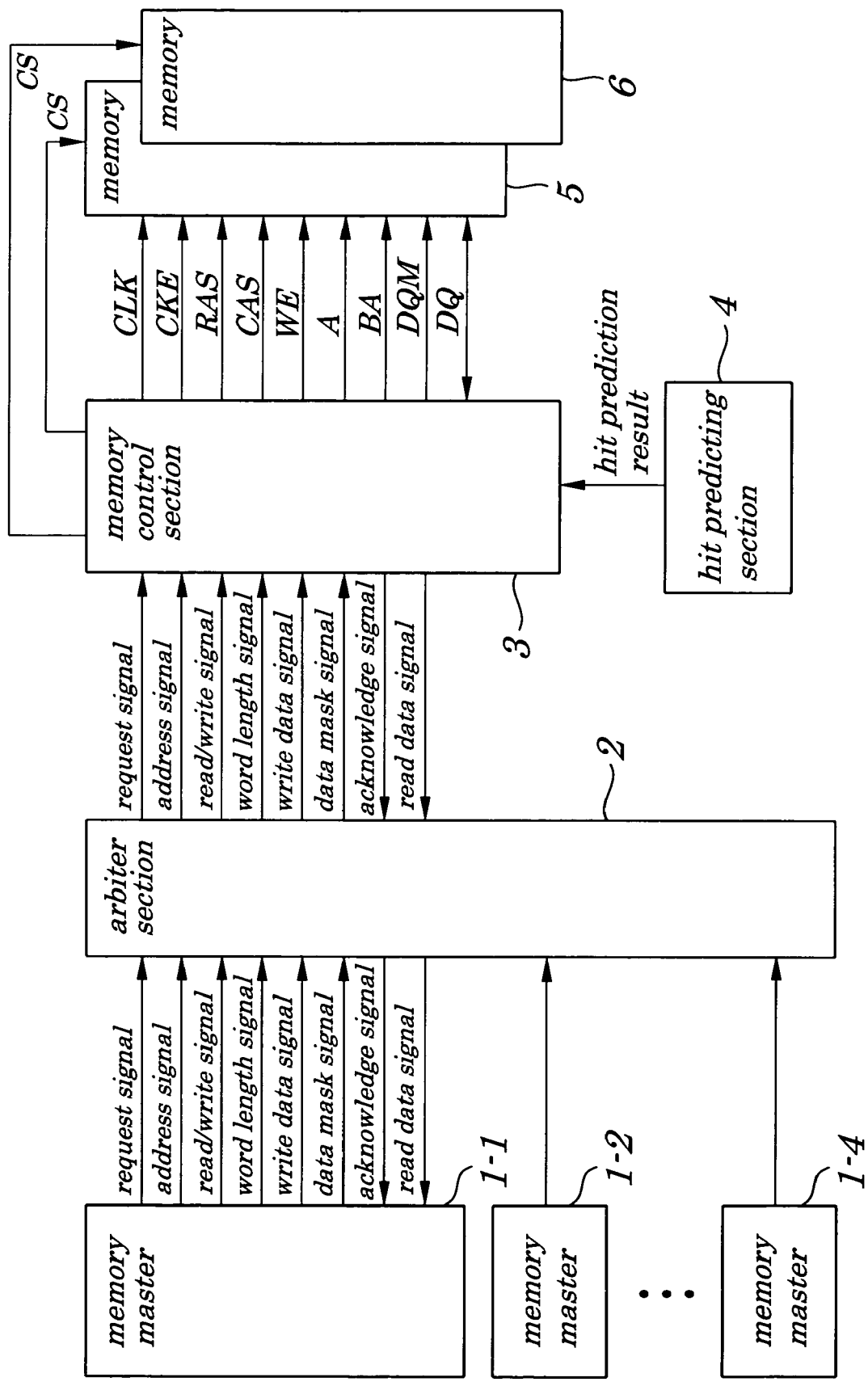
FIG. 4 is still another block diagram showing a system made up of the memory control section and a plurality of memories corresponding to still another embodiment of the present invention.

FIG. 4 is a block diagram showing a system made up of a memory control section 3 and a plurality of memories 5 and 6 corresponding to another embodiment of the present invention.

Each of the memory masters 1-1 to 1-4 outputs a request signal for requesting a right to use memory, an address signal, a read/write signal showing a type of access, a word length signal showing the number of words to be accessed, a write data signal, and a data mask signal to an arbiter section 2 and receives an acknowledge signal showing acquisition of memory for use and read data signal from the arbiter section 2.

The arbiter section 2 outputs a request signal, an address signal, a read/write signal, a word length signal, a write data signal, and a data mask signal selected from two or more memory masters 1 -1 to 1 -4 to the memory control section 3 and receives an acknowledge signal and a read data signal from the memory control section 3.

The memory control signal 3 outputs control signals of memory, that is, in the case of an SDRAM, a clock signal (CLK), a clock enable signal (CKE), a chip select signal (CS), a row address strobe signal (RAS), a column address strobe signal (CAS), a write enable signal (WE), an address signal (A), a bank address signal (BA), a data input/output signal (DQ), and a date mask signal (DQM).

The hit predicting section 4 outputs a plurality of hit prediction results to the memory control section 3. The number of hit prediction results are the same as the total number of all memories 5 and 6 connected.

For example, if memories 5 and 6, each having four banks, are connected, since there exist eight banks in an entire system, the predicted number obtained as the hit prediction results becomes eight.

Each of memory masters 1 -1 to 1 -4, when memory is to be accessed, asserts a request signal and, at the same time, determines an address signal, a read/write signal, a word length signal, a write data signal, and a data mask signal.

The arbiter section 2, if only one memory master has asserted a request signal, outputs an address signal, a read/write signal, a word length signal, a write data signal, and a data mask signal fed from the one memory master to the memory control section 3 and returns an acknowledge signal and a read data signal fed from the memory control section 3 to the one memory master.

The arbiter section 2, if two or more memory masters have asserted request signals, selects one memory master out of the two or more memory masters and outputs an address signal, a read/write signal, a word length signal, a write data signal, and a data mask signal fed from the memory masters to the memory control section 3 and returns an acknowledge signal and a read data signal fed from the memory control section 3 to the memory master.

As a method for selecting one memory master from two or more memory masters, there is a method by which one memory master is selected according to a predetermined priority order, a method by which one memory master in priority order most removed or farthest from the time when last access is obtained is selected according to a round-robin method, and the like.

The memory control section 3, when a request signal fed from the arbiter section 2 is asserted, receives an address signal, a read/write signal, and a word length signal, and produces a control signal for memory to get write access, if a read/write signal indicates write-access, and, to get read access if the read/write signal indicates read-access.

The memory control section 3, when write access is obtained, receives a write data signal and a data mask signal and returns, when read access is obtained, read data fed back from memory using a read data signal to the arbiter section 2.

The memory control section 3, when last data is accessed, determines whether or not a bank being presently accessed is closed by referring to a hit prediction result fed from the hit predicting section 4.

The last data denotes, for example, fourth data if a word length signal indicates that four words are to be accessed.

As a hit prediction result fed from the hit predicting section 4, an individual result is output for each bank in memory and the memory control section 3 makes reference to a hit prediction result corresponding to a bank in which last data is stored.

Moreover, the memory control section 3 determines whether a bank being presently accessed is closed by making reference not only to the last data but also to a hit prediction result fed from the hit predicting section 4 when next data is stored in a bank different from the bank presently being accessed.

Figure 5:
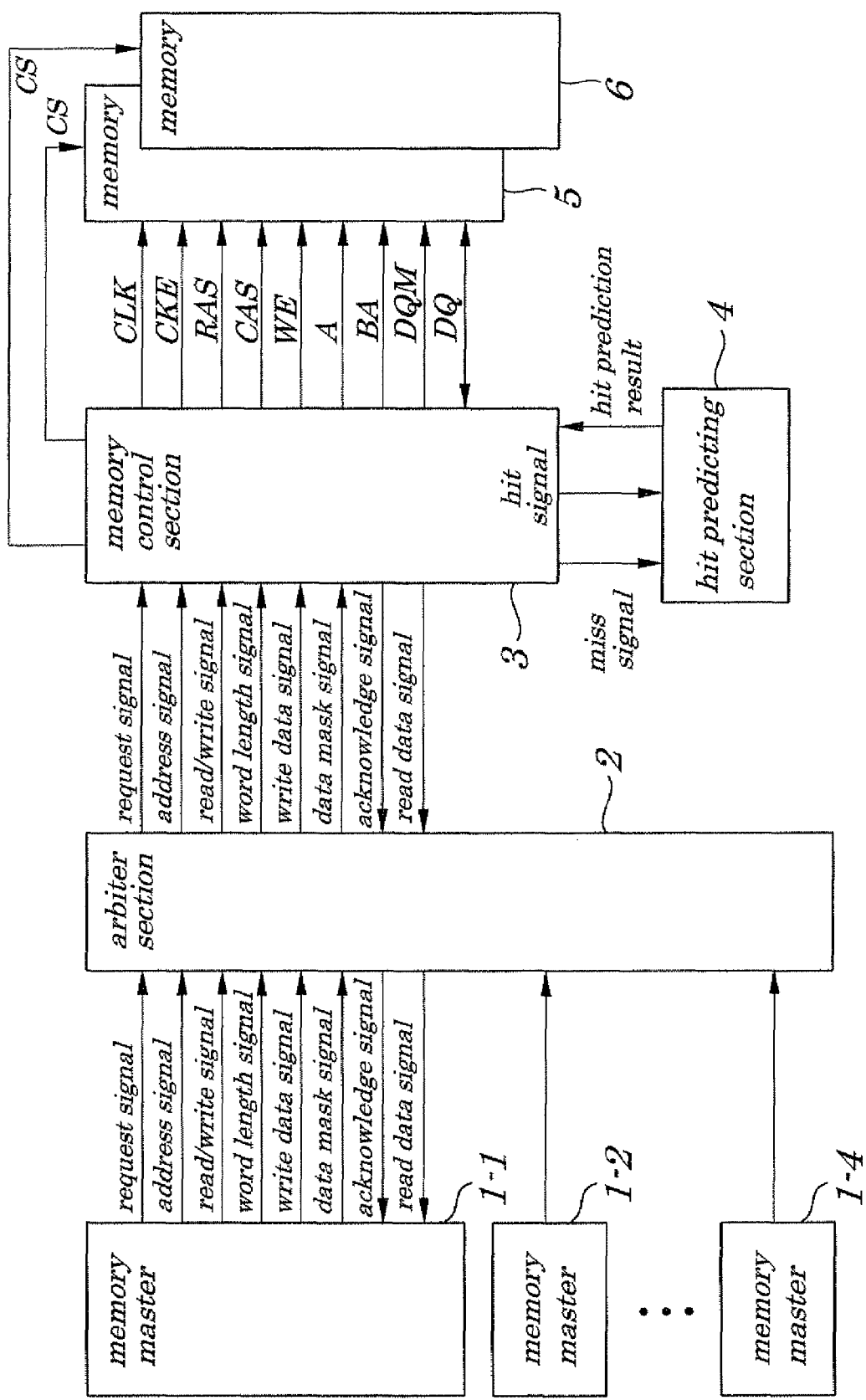
FIG. 5 is a still another block diagram showing the system made up of a memory control section and a plurality of memories corresponding to yet another embodiment of the present invention.

FIG. 5 is still another block diagram showing a system made up of a memory control section 3 corresponding to still another embodiment of the present invention, and a plurality of memories 5 and 6 according to an embodiment of the present invention.

The hit predicting section 4 receives a hit signal or a miss signal from the memory control section 3. Each of the number of hit results and miss results is the same as the total number of all banks in memory.

The memory control section 3, if an address used for access indicates the same page as was accessed the previous access-time, i.e. time when access is started, in each bank, asserts a hit signal of a corresponding bank.

Moreover, the memory control section 3, if an address used for access indicates a page different from a page that was accessed the previous access-time in each bank, asserts a miss signal of a corresponding bank.

The time when access is started, or access-time, includes not only time when access is first started after a request signal fed from the arbiter section 2 has been asserted but also time when access is next started if each of data having been currently accessed and data being accessed next is stored in each of different banks before access to a length of words indicated by a word length signal is completed.

The memory control section 3, in order to produce a hit signal or a miss signal, has to store a page that was accessed last or previous time for each bank.

Moreover, operations of the hit predicting section 4 stated in an embodiment shown in FIG. 5 are in conformance with those stated in an embodiment shown in FIG. 2. Similarly, operations of the hit predicting section stated in other embodiments shown in FIG. 5 are in conformance with those stated in other embodiments shown in FIG. 2.

Figure 6:
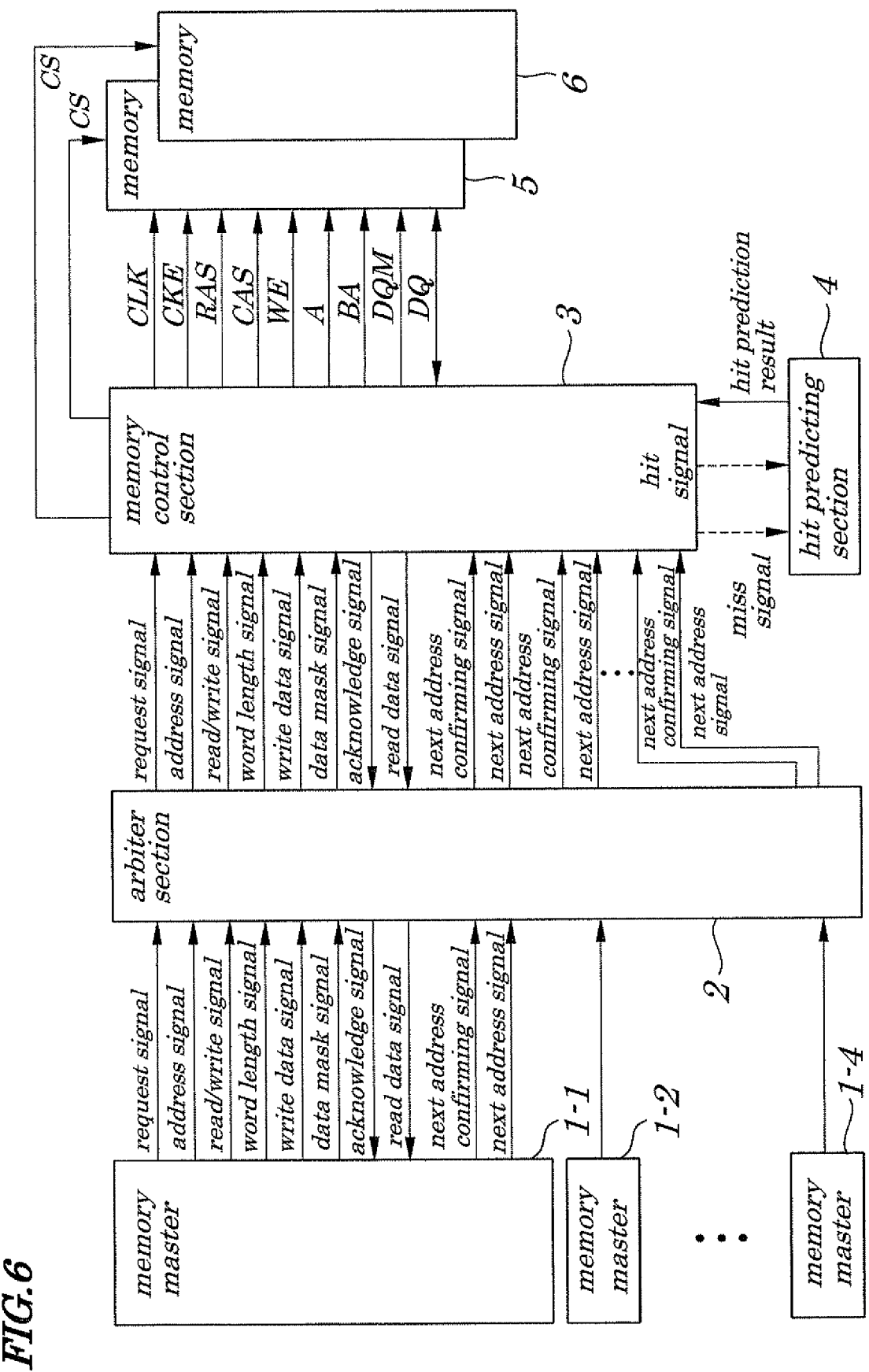
FIG. 6 is still another block diagram showing the system made up of a memory control section and a plurality of memories corresponding to still another embodiment of the present invention.

FIG. 6 is a block diagram showing the system made up of the memory control section 3 and a plurality of memories 5 and 6 according to an embodiment of the present invention.

In addition to the example corresponding to the embodiment shown in FIG. 4, each memory master outputs a next address confirmation signal indicating an address to be used when access is required next and its address signal showing that its address signal is determined to the arbiter section 2 and memory control section 3.

The memory control section 3, when last data is accessed, determines whether or not to close a bank by making reference to a hit prediction result fed from the hit predicting section 4. At this point, if there is one or more of the memory masters that are outputting a next address confirming signal and if there is a memory master in which both the bank and the page indicated by its next address signal are matched to both the bank and the page being accessed presently, the memory control section 3 terminates its routine without closing the bank being presently accessed, regardless of a hit prediction result fed from the hit predicting section 4. Also, the arbiter section 2, when selecting a memory master that accesses memory next, selects a memory master in which both the bank and the page indicated by the next address signal are matched to both the bank and the page being accessed presently.

On the other hand, if there is one or more memory masters that are outputting a next address confirming signal, and if there is a memory master in which only the bank, of the bank and the page indicated by its next address signal, is matched only to the bank, and the page, of the bank and the page indicated by its next address signal, is not matched to the page being accessed presently, the memory control section 3 closes the bank being accessed and terminates the memory control section's routine, regardless of a hit prediction result fed from the hit predicting section 4.

For example, let it be assumed that there are three memory masters 1-1, 1-2, and 1-3, that the memory master 1-1 is being presently accessed which has as its last address bank 0 and page 0. When the memory masters 1-2 and 1-3 assert a next address confirming signal and if a bank and a page indicated by the next address signal output from the memory master 1-2 is 0 and 0 respectively and, if a bank and a page indicated by the next address signal output form the memory master 1-3 is 0 and 1 respectively, the memory control section 3, regardless of a hit prediction result fed from the hit predicting section 4, terminates its routine without closing the bank 0 while the memory master 1-1 is accessing the bank and the page, and the arbiter section 2 selects the memory master 1-2 following the memory master 1-1.

The memory master 1-2 gets access to the bank 0 and page 0. However, since the bank 0 has been already opened at the page 0, the memory master 1-2 can start access immediately after the memory master 1-1 has completed its access.

If the bank 0 had been closed at the time of completion of access by the memory master 1-1, memory access would have had to be started after the bank 0 had been made active, so that time would have been spent before the next memory access could be started.

Moreover, if the memory master 1-3 had been selected subsequent to the memory master 1-1, the bank 0 has to be made active after the bank 0 has been pre-charged, so that time is spent before the next memory access is started.

Moreover, if a bank and a page indicated by a next address signal output from the memory master 1-2 is 0 and 1 respectively, and, if a bank and a page indicated by a next address signal output from the memory master 1-3 is 0 and 2 respectively, the memory control section 3, regardless of a hit prediction result fed from the hit predicting section 4, closes the bank 0 at the time when the memory master 1-1 completes its access and terminates its routine.

If either a memory master 1-2 or a memory master 1-3 subsequent to the memory master 1-1 is selected, access is obtained to the bank 0 in memory. However, since the bank 0 is closed, after the memory master 1-1 has accessed the bank, the bank 0 can be made active and, after the bank 0 has been made active, memory can be accessed.

When the bank 0 was closed when the memory master 1-1 had completed the access, the bank 0 has to be made active after the bank 0 has been pre-charged following completion of access by the memory master 1-1 and, as a result, time is spent before memory access is started again.

Figure 7:
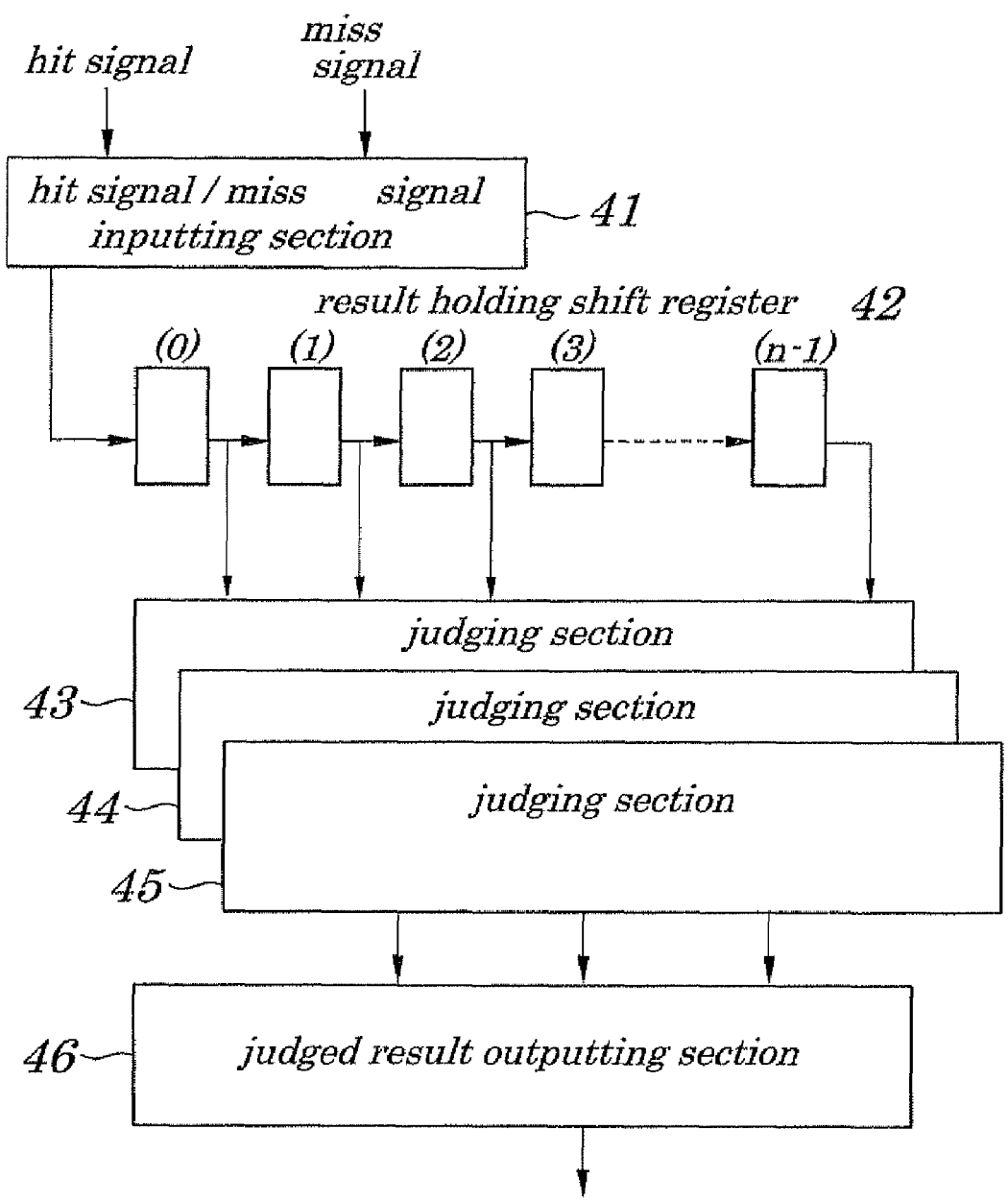
FIG. 7 is a block diagram showing configurations of one bank installed in a hit predicting section corresponding to still another embodiment of the present invention.

Next, a concrete example of configurations of the hit predicting section 4 is described by referring to FIG. 7. FIG. 7 is a block diagram showing configurations of one bank installed in a hit predicting section.

Moreover, the hit predicting section 4 has blocks, each of which has the configurations shown in FIG. 7, equal in number to the banks, which are not shown. In addition to this, the hit predicting section 4 also has a section (not shown) to receive an instruction for setting of "j-1", "k-1", and "m" (instruction for setting "j", "k", and "m") and to hold these set values.

In FIG. 7, a hit signal/miss signal inputting section 41, when either of a hit signal or a miss signal is input, shifts a result holding shift register 42 by one bit and inputs, when a hit signal is input, a numeric code 1 indicating a hit, to bit 0 and, when a miss signal is input, a numeric code 0 indicating a miss, to bit 0 in the shift register.

A judging section 43 receives a value "k-1" from the holding circuit (not shown) and outputs a numeric code "1" if all bits for the bit "0" to bit "k-1" in the result holding shift register 42 are 0 (zero) and outputs a numeric code "0" if all bits from the bit "0" to bit "k-1" in the result holding shift register 42 are not 0.

The judging section 44 receives a value "j-1" from the holding circuit (not shown) and outputs a numeric code "1" if all bits from the bit "0" to bit "j-1" in the result holding shift register 42 are "1" (one) and outputs a numeric code "0" if all bits from the bit "0" to bit "j-1" in the result holding shift register 42 are 0.

The judging section 45 receives an "m" value from the holding circuit and adds all bits from the bit "0" to bit "n-1" in the result holding shift register 42 and outputs, if the result of the addition is "m" or more, a numeric code "1" and outputs, if the result of the addition is less than "m", a numeric code 0.

A judged result outputting section 46 outputs a numeric code "0" indicating a miss signal if a result fed from the judging section 43 shows "1", and a numeric code "1" indicating a hit signal if the result fed from the judging section 43 shows "0" and the result fed from the judging section 44 shows "1" and a numeric code "1" if both the results fed from the judging section 43 and the judging section 44 show "0" and the result fed from the judging section 45 shows "1" and a numeric code "0" indicating a miss signal if all the results from the judging section 43, the judging section 44, and the judging section 45 show "0".

As described above, if eight pieces of banks exist in an entire system, the hit predicting section 4 also has eight sets of these circuits.

The circuit for each bank in the hit predicting section 4 in one embodiment is made up of the hit signal/miss signal inputting section 41, n-but result holding shift register 42, and the judging section 45 and uses an output from the judging section 45 as a hit prediction result.

The circuit for each bank in the hit predicting section 4 in another embodiment is made up of a hit signal/miss signal inputting section 41, a maximum n-bit result holding shift register 42, and the judging section 44, and uses an output from the judging section 44 as a hit prediction result.

The circuit for each bank in the hit predicting section 4 in yet another embodiment is made up of the hit signal/miss signal inputting section 41, a maximum n-bit resulting holding shift register 42, and the judging section 43, and uses an output from the judging section 43 as a hit prediction result.

Figure 8:
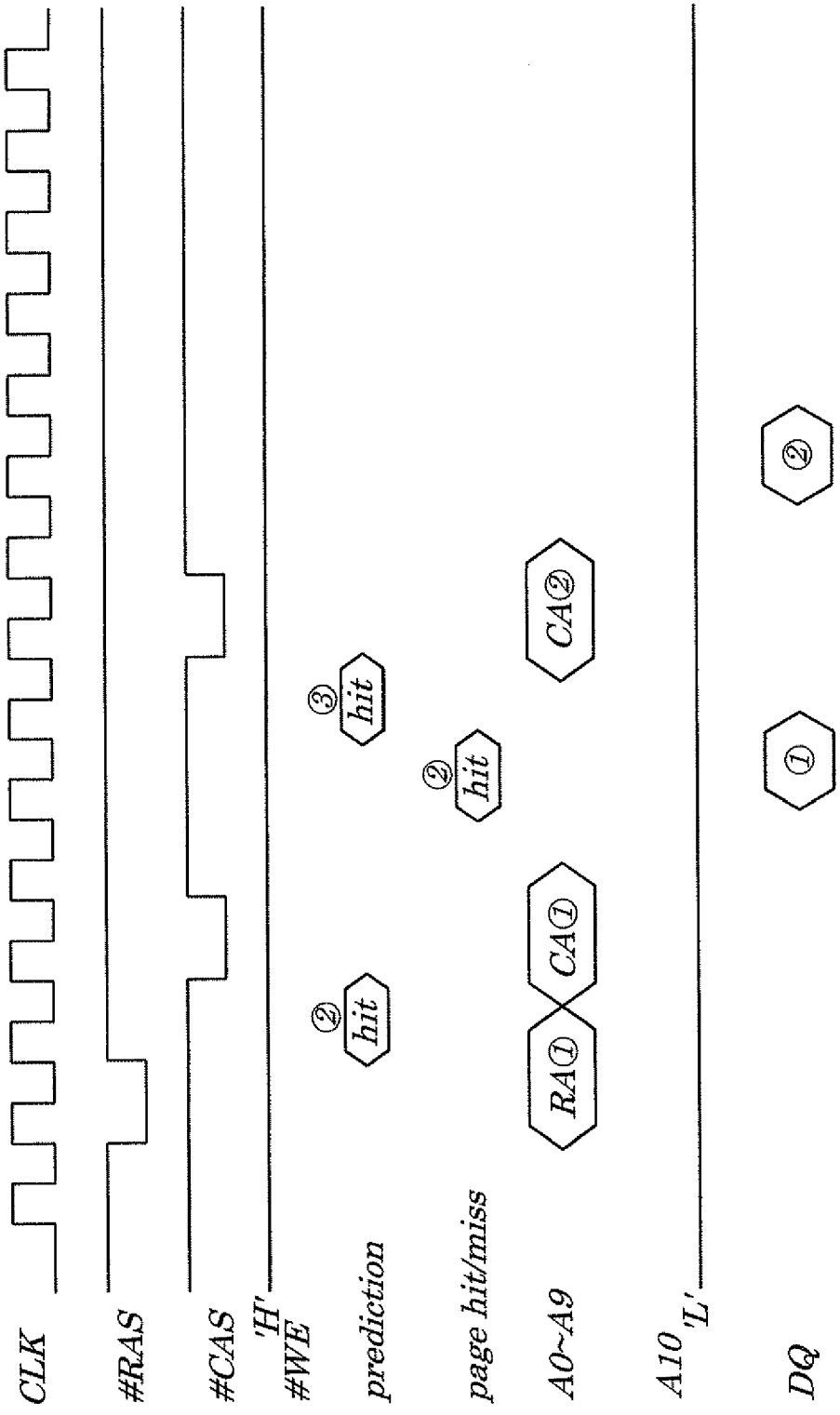
FIG. 8 is a timechart showing a case in which the memory access control device of the present invention, while getting read-access, predicts a hit in the next access and a hit is found in the access.
Figure 9:
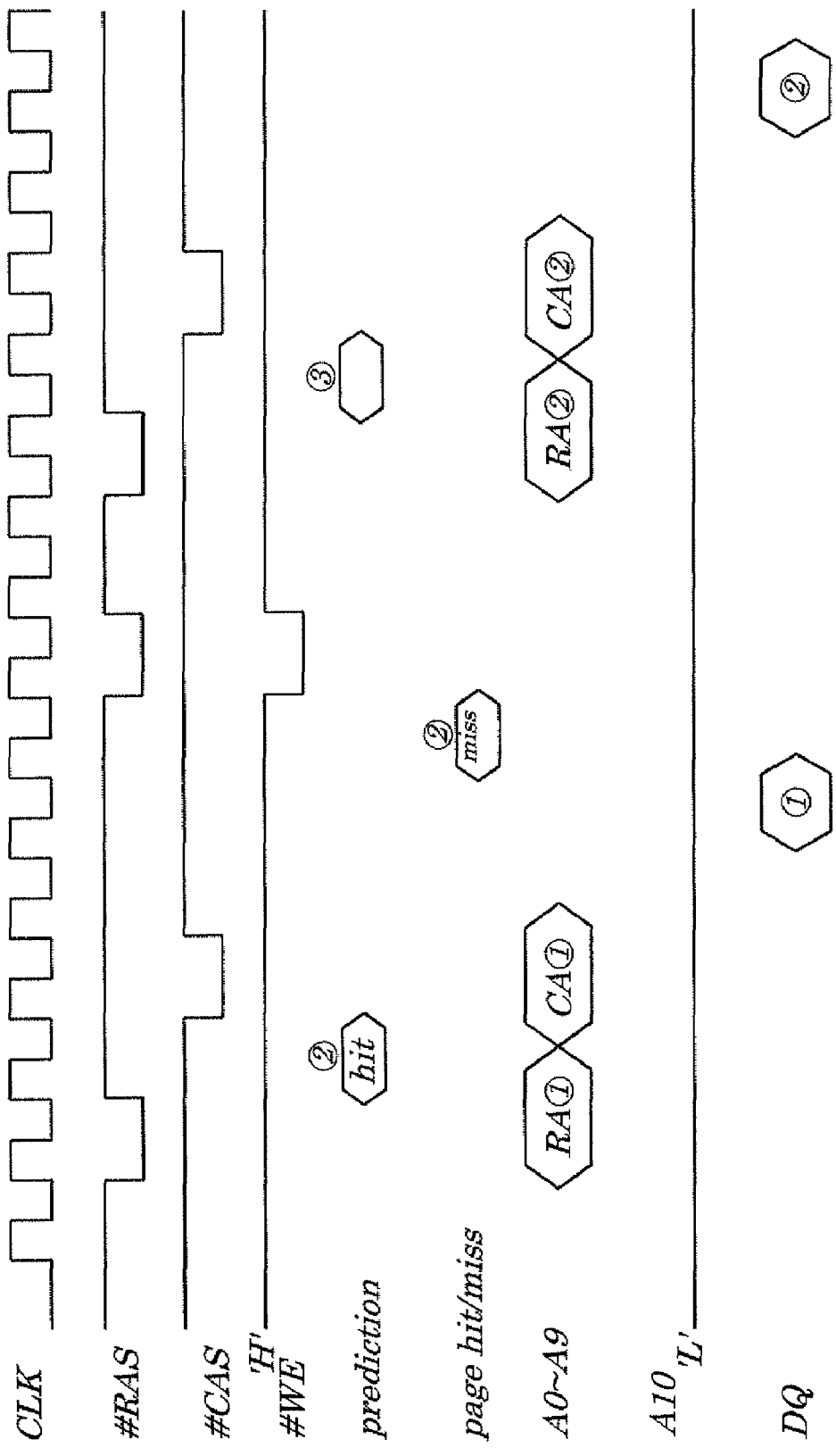
FIG. 9 is a timechart showing a case in which the memory access control device of the present invention, while getting read-access, predicts a hit in the next access and a miss is found in the access.

An example of timing with which the memory control section 3 controls signals to be fed to memory based on prediction of the hit predicting section 4 is described by using timecharts in FIG. 8 to FIG. 10.

The example is shown in which an SDRAM is used as memory and read access is obtained.

FIG. 8 is a timechart showing a case in which the memory access control device of the present invention, while getting read-access, predicts a hit in the next access and a hit is found in the access. A number sign "#" at a head of a signal name represents a signal being active "LOW".

In FIG. 8, when, following access ①, a hit is predicted in access ②, no pre-charging is performed when access is completed. Since a hit is found in the next access and switching of A0 to A9 and/or issuance of a LOW active command (#RAS is made LOW) is not required, the next access is obtained earlier.

FIG. 9 is a timechart showing a case in which the memory access control device of the present invention, while getting read-access, predicts a hit in next access and a miss is found in the access.

When a hit is predicted, no pre-charge is performed at the time of completion of access. If a miss occurs in the next access, after pre-charge command (#RAS and #WE are made LOW at the same time) has been issued, issuance of the LOW active command (#RAS is made LOW) following switching of A0 to A9 to LOW address is required, so that the next access is obtained later.

FIG. 10 is a timechart showing a case in which the memory access control device of the present invention, while getting read-access, predicts a miss in the next access. Since a miss is predicted, at the time of completion of access, A10 is enabled and auto-precharge is performed.

Or, a pre-charge command (#RAS and #WE are made LOW at the same time, as shown in dotted lines) may be issued.

In this case, if a hit is found in subsequent access ② or a miss is found in subsequent access ②, result data determining timing for access ② remains unchanged.

Access time is shortened to two-thirds or less when compared with a case in which a miss occurs after a hit is predicted.

It is apparent that the present invention is not limited to the above embodiments but may be changed and modified without departing from the scope and spirit of the invention.

What is claimed is:

1. A memory access control device comprising:
a memory master to request access to memory;
a memory control unit to produce control signals of memories based on access information to be output from said memory master; and
a hit predicting unit to predict whether or not a next access to each bank in memory will be directed to a same page;
wherein, for each of a last natural number of times of accesses to each bank in memory, said hit predicting unit stores whether a hit or a miss has been found as history information; an
wherein, when said hit predicting unit predicts a hit based on the history information, said memory control unit terminates a routine without closing a bank at a time of completion of present access operations, and when when said hit predicting unit predicts a miss based on the history information, said memory control unit closes said bank at the time of completion of present access operations and terminates the routine; and
wherein after a bank and a page to be accessed next have been determined, said memory master informs said memory control unit of information about said bank and said page to be accessed and wherein said memory control unit, if said bank to be accessed next by said memory master is the bank being presently accessed and said page to be accessed by said memory master is the page being presently accessed, said memory control unit terminates the routine, regardless of a prediction from said hit predicting unit, without closing said bank being presently accessed at the time of completion of present access operations, and if, if said bank to be accessed next by said memory master is the bank being presently accessed and said page to be accessed by said memory master is different from the page being presently accessed, said memory control unit closes said bank being presently accessed at the time of completion of present access operations, regardless of the prediction from said hit predicting unit, and said memory control unit terminates the routine.

2. The memory access control device according to claim 1, wherein, for each of a last "n" ("n" is a natural number) times of accesses to each bank in memory, said hit predicting unit stores whether a hit or a miss has been found, and said hit predicting unit predicts a hit if, out of the last "n" times of accesses, a number of times of accesses in which a hit has been found is "m" or more (m≦n: "m" is a natural number), "m" being a result of adding said number of times of accesses in which a hit has been found, and said hit predicting unit predicts a miss, if said number of times of accesses is not "m" or more.

3. The memory access control device according to claim 1, wherein, for each of a last "n" ("n" is a natural number) times of accesses to each bank in memory, said hit predicting unit stores whether a hit or a miss has been found, and said hit predicting unit predicts a miss when a miss has been found in all of the last "k" times of accesses (k≦n: "k" is a natural number) out of the last "n" times of accesses, and said hit predicting unit predicts a hit when a hit has been found at least one time in all of the last "k" times of accesses out of the last "n" times of accesses and if a hit has been found in all of the last "j" times of accesses (j≦n: "j" is a natural number) out of the last "n" times of accesses, and said hit predicting unit predicts a hit when a miss has been found at least one time in all of the last "j" times of accesses out of the last "n" times of accesses, and if a number of times of accesses in which a hit has been found out of the last "n" times of accesses is "m" times or more (m≦n: "m" is a natural number), "m" being a result of adding said number of times of accesses in which a hit has been found, and said hit predicting unit predicts a miss when said number of times of accesses is not "m" times or more.

4. A memory access control device comprising:
two or more memory masters to request access to memory;
an arbiter unit to arbitrate memory access requests fed from said memory masters and to select access information fed from any one of said memory masters;
a memory control unit to produce a control signal of memory based on access information output from said arbiter unit; and
a hit predicting unit to predict whether or not a next access to each bank in memory will be directed to a same page;
wherein, for each of a last natural number of times of accesses to each bank in memory, said hit predicting unit stores whether a hit or a miss has been found as history information; and
wherein, when said hit predicting unit predicts a hit based on the history information, said memory control unit terminates a routine without closing said bank at a time of completion of present access operations, and when said hit predicting unit predicts a miss based on the history information, said memory control unit closes said bank at the time of completion of present access operations and terminates the routine; and
wherein after a bank and a page to be accessed next have been determined, each memory master informs said arbiter unit and said memory control unit of information about said bank and said page to be accessed next; and
wherein if there exists said memory master which gets the next access to the bank being presently accessed and to the page being presently accessed, said memory control unit terminates the routine, regardless of a prediction from said hit predicting unit, without closing said bank being present accessed at the time of completion of present access operations, and said arbiter unit selects said memory master with priority, and if there exists said memory master which gets the next access to the bank being presently accessed and to a page different from the page being presently accessed, said memory control unit closes said bank being presently accessed at the time of completion of present access operations, regardless of the prediction from the hit predicting unit, and said memory control unit terminates the routine.

5. The memory access control device according to claim 4, wherein, for each of a last "n" ("n" is a natural number) times of accesses to each bank in memory, said hit predicting unit stores whether a hit or a miss has been found and said hit predicting unit predicts a hit if, out of the last "n" times of accesses, a number of times of accesses in which a hit has been found is "m" or more (m≦n: "m" is a natural number), "m" being a result of adding said number of times of accesses in which a hit has been found, and said hit predicting unit predicts a miss, if said number of times of accesses is not "m" or more.

6. The memory access control device according to claim 4, wherein, for each of a last "n" ("n" is a natural number) times of accesses to each bank in memory, said hit predicting unit stores whether a hit or a miss has been found, and said hit predicting unit predicts a miss when a miss has been found in all of the last "k" (k≦n: "k" is a natural number) times of accesses out of the last "n" times of accesses, and said hit predicting unit predicts a hit when a hit has been found at least one time in all of the last "k" times of accesses out of the last "n" times of accesses and if a hit is found in all of the last "j" times of accesses (j≦n: "j" is a natural number) out of the last "n" times of accesses, and said hit predicting unit predicts a hit when a miss has been found at least one time in all of the last "j" times of accesses out of the last "n" times of accesses, and if a number of times of accesses by which a hit has been found out of the last "n" times of accesses is "m" times or more (m≦n: "m" is a natural number), "m" being a result of adding said number of times of accesses in which a hit has been found, and said hit predicting unit predicts a miss, when said number of times of accesses is not "m" times or more.

* * * * *